(12) United States Patent
Xiao et al.

(10) Patent No.: US 8,533,806 B2
(45) Date of Patent: Sep. 10, 2013

(54) METHOD FOR AUTHENTICATING A TRUSTED PLATFORM BASED ON THE TRI-ELEMENT PEER AUTHENTICATION(TEPA)

(75) Inventors: Yuelei Xiao, Xi'an (CN); Jun Cao, Xi'an (CN); Li Ge, Xi'an (CN); Xiaolong Lai, Xi'an (CN); Zhenhai Huang, Xi'an (CN)

(73) Assignee: China Iwncomm Co., Ltd., Xi'an (CN)

( * ) Notice: Subject to any disclaimer, the term of this patent is extended or adjusted under 35 U.S.C. 154(b) by 160 days.

(21) Appl. No.: 13/119,909

(22) PCT Filed: Nov. 3, 2009

(86) PCT No.: PCT/CN2009/074763
§ 371 (c)(1),
(2), (4) Date: Mar. 18, 2011

(87) PCT Pub. No.: WO2010/051742
PCT Pub. Date: May 14, 2010

(65) Prior Publication Data
US 2011/0202992 A1  Aug. 18, 2011

(30) Foreign Application Priority Data

Nov. 4, 2008  (CN) .......................... 2008 1 0232093

(51) Int. Cl.
*G06F 7/04* (2006.01)
*G06F 15/16* (2006.01)
*G06F 17/30* (2006.01)
*H04L 29/06* (2006.01)

(52) U.S. Cl.
USPC .......................................................... 726/10

(58) Field of Classification Search
USPC ................................ 726/10, 5, 6, 7
See application file for complete search history.

(56) References Cited

U.S. PATENT DOCUMENTS 7,293,284 B1   11/2007   Bartram et al.
7,930,563 B2   4/2011    Ebringer et al.
(Continued)

FOREIGN PATENT DOCUMENTS

| CN | 101136928 A | 3/2008 |
| CN | 101159660 A | 4/2008 |
| CN | 101242266 A | 8/2008 |
| CN | 101286840 A | 10/2008 |
| CN | 101394283 A | 3/2009 |
| EP | 2211570 A1 | 7/2010 |

(Continued)

OTHER PUBLICATIONS

Extended European Search Report regarding Application No. 09824397.5-1860/2346207, dated Mar. 27, 2013.

*Primary Examiner* — Kambiz Zand
*Assistant Examiner* — Dant Shaifer Harriman
(74) *Attorney, Agent, or Firm* — Harness, Dickey & Pierce, P.L.C.

(57) ABSTRACT

A method for authenticating a trusted platform based on the Tri-element Peer Authentication (TePA). The method includes the following steps: A) a second attesting system sends the first message to a first attesting system; B) the first attesting system sends a second message to the second attesting system after receiving the first message; C) the second attesting system sends a third message to a Trusted Third Party (TTP) after receiving the second message; D) the TTP sends a fourth message to the second attesting system after receiving the third message; E) the second attesting system sends a fifth message to the first attesting system after receiving the fourth message; and F) the first attesting system performs an access control after receiving the fifth message. The method for authenticating a trusted platform based on TePA of the present invention adopts the security architecture of TePA, and improves the safety of an evaluation agreement of the trusted platform, realizes the mutual evaluation of the trusted platform between the attesting systems, and extends the application ranges.

11 Claims, 1 Drawing Sheet

(56) References Cited

U.S. PATENT DOCUMENTS

| | | | |
|---|---|---|---|
| 8,060,934 B2 | 11/2011 | Cabuk et al. | |
| 2005/0187966 A1* | 8/2005 | Iino | 707/102 |
| 2009/0013181 A1* | 1/2009 | Choi et al. | 713/168 |
| 2009/0271618 A1 | 10/2009 | Camenisch et al. | |
| 2010/0077454 A1 | 3/2010 | Xiao et al. | |

FOREIGN PATENT DOCUMENTS

| | | |
|---|---|---|
| JP | 2005301550 A | 10/2005 |
| JP | 2008535049 A | 8/2008 |
| JP | 2009015818 A | 1/2009 |
| JP | 2010503252 A | 1/2010 |
| WO | WO-2006100522 A1 | 9/2006 |

* cited by examiner

METHOD FOR AUTHENTICATING A TRUSTED PLATFORM BASED ON THE TRI-ELEMENT PEER AUTHENTICATION(TEPA)

CROSS-REFERENCE TO RELATED APPLICATIONS

This application claims priority to Chinese Patent Application no. 200810232093.5, filed with the Chinese Patent Office on Nov. 4, 2008 and entitled "Trustworthy Platform Verification Method Based On Tri-element Peer Authentication (TePA)", which is hereby incorporated by reference in its entirety.

This application is a 371 U.S. National Stage of International Application No. PCT/CN2009/074763, filed Nov. 3, 2009. This application claims the benefit of Chinese Patent Application No. 200810232093.5, filed Nov. 4, 2008. The disclosures of the above applications are incorporated herein by reference.

FIELD OF THE INVENTION

The present invention relates to a trustworthy platform verification method based on tri-element Peer Authentication (TePA).

BACKGROUND OF THE INVENTION

The issue of network security has been challenged severely along with gradual development of computer network. Existing security solutions in the field tend to be focused on preventing the hazards from the outside firstly and then from the inside, that is, firstly preventing the hazards from a service facility and then from a terminal facility. However, trusted computing runs to the contrary by firstly ensuring security of all terminals, that is, by building a larger security system through ensuring secured components. Higher-level precaution is taken at an underlying layer of a trusted computing platform, and an enhanced protection space and scope of selections can be provided for users by preventing a soft-level attack through trustworthy hardware.

A Challenger (CH) has to evaluate the trusted computing platform by a certain platform attribute to verify trustworthiness of the trusted computing platform. In trusted computing specification established by the Trusted Computing Group (TCG), the Challenger CH evaluates the trusted computing platform by platform integrity, where the evaluated trusted computing platform is referred to an Attesting System (AS), and FIG. 1 illustrates a corresponding trusted platform evaluation protocol as follows:

1) The Challenger CH generates a random number $N_{CH}$ and transmits a message $1=N_{CH}$ to the Attesting System AS.

2) Upon reception of the message 1, the Attesting System AS firstly transports the random number $N_{CH}$ to a Trusted Platform Module (TPM) thereof and then extracts Platform Configuration Register values $PCRs_{AS}$ of the Attesting System AS by the Trusted Platform Module TPM of the Attesting System AS, extracts the measurement logs $Log_{AS}$ corresponding to the Platform Configuration Register values $PCRs_{AS}$ of the Attesting System AS from the Store Measurement Log (SML) of the Attesting System AS using a signature $[PCRs_{AS}, N_{CH}]_{Sig}$ performed with a private key of an Attesting Identity Key (AIK) of the Attesting System AS on the Platform Configuration Register values $PCRs_{AS}$ of the Attesting System AS and the random number $N_{CH}$, and finally transmits a message $2=PCRs_{AS}\|Log_{AS}\|[PCRs_{AS}, N_{CH}]_{Sig}$ to the Challenger CH, where $\|$ represents concatenation of character strings.

3) Upon reception of the message 2, the Challenger CH firstly verifies the signature against a public key of the Attesting Identity Key AIK of the Attesting System AS, the random number $N_{CH}$ and the Platform Configuration Register values $PCRs_{AS}$ of the Attesting System AS in the message 2 and discards the message 2 if the signature is invalid, otherwise verifies correctness of the measurement logs $Log_{AS}$ corresponding to the Platform Configuration Register values $PCRs_{AS}$ of the Attesting System AS in the message 2 against the Platform Configuration Register values $PCRs_{AS}$ of the Attesting System AS in the message 2 and terminates the protocol process if it is incorrect, otherwise verifies trustworthiness of the Attesting System AS against the measurement logs $Log_{AS}$ corresponding to the Platform Configuration Register values $PCRs_{AS}$ of the Attesting System AS in the message 2 and reference integrity values of respective components in the measurement logs $Log_{AS}$.

In the foregoing trusted platform evaluation protocol, messages exchanged between the Attesting System AS and the Challenger CH are transmitted over a secure channel. As can be apparent from the trusted platform evaluation protocol illustrated in FIG. 1, this protocol is applicable only to unidirectional trusted platform evaluation, and the Challenger CH has to be capable of verifying the Attesting Identity Key AIK and platform integrity of the Attesting System AS, where the Challenger CH can verify the Attesting Identity Key AIK of the Attesting System AS based upon Trusted Third Party (TTP) or through Direct Anonymous Attestation (DAA). When Attesting Systems AS have to be mutually verified trustworthiness of opposite platform, however, if one of the Attesting Systems AS is incapable of verifying the Attesting Identity Key AIK and platform integrity of the opposite Attesting System AS, then the Attesting Identity Key AIK and platform integrity of the Attesting System AS can not be verified in the prior art.

SUMMARY OF THE INVENTION

In order to address the foregoing technical problem in the prior art, the invention provides a method for verifying an Attesting Identity Key AIK and platform integrity of an Attesting System AS through a Trusted Third Party TTP, i.e., a trusted platform verification method based on Tri-element Peer Authentication (TePA).

In a technical solution of the invention, the invention is a trusted platform verification method based on Tri-element Peer Authentication, wherein the method includes the steps of:

A) transmitting, by a second Attesting System, a first message to a first Attesting System, wherein the first message includes a random number $N_{AS2}$ generated by the second Attesting System, an Attesting Identity Key AIK certificate $Cert_{AIK-AS2}$ of the second Attesting System and a parameter list $Parm_{PCRs-AS1}$ of Platform Configuration Register values PCRs requested by the second Attesting System from the first Attesting System;

B) transporting, by the first Attesting System, the $N_{AS2}$ to a Trusted Platform Module TPM of the first Attesting System, and then extracting corresponding Platform Configuration Register values $PCRs_{AS1}$ from the Trusted Platform Module TPM based on the parameter list $Parm_{PCRs-AS1}$ of PCRs, performing a signature $[N_{AS2}, PCRs_{AS1}]_{Sig}$ on the $PCRs_{AS1}$ and the $N_{AS2}$ using a private key of an Attesting Identity Key AIK of the first Attesting System, extracting the measurement logs $Log_{AS1}$ corresponding to the $PCRs_{AS1}$ from the Store Measurement Log SML of the first Attesting System, and transmitting a second message to the second Attesting System $AS_2$, wherein the second message includes a random number $N_{AS1}$ generated by the first Attesting System, an Attesting Identity Key AIK certificate $Cert_{AIK\text{-}AS1}$ of the first Attesting System and a parameter list $Parm_{PCRs\text{-}AS2}$ of Platform Configuration Register values PCRs requested by the first Attesting System from the second Attesting System;

C) verifying, by the second Attesting System, the signature against a public key of the Attesting Identity Key AIK certificate of the first Attesting System, the $N_{AS2}$ and the $PCRs_{AS1}$, and if the signature is invalid, then discarding the second message; otherwise, transmitting the $N_{AS1}$ to a Trusted Platform Module TPM of the second Attesting System, extracting from the Trusted Platform Module TPM of the second Attesting System corresponding Platform Configuration Register values $PCRs_{AS2}$ against the $Parm_{PCRs\text{-}AS2}$, performing a signature $[N_{AS1}, PCRs_{AS2}]_{Sig}$ on the $PCRs_{AS2}$ and the $N_{AS1}$ using a private key of an Attesting Identity Key AIK of the second Attesting System, extracting the measurement logs $Log_{AS2}$ corresponding to the Platform Configuration Register values $PCRs_{AS2}$ from the Store Measurement Log SML of the second Attesting System, and transmitting to a Trustworthy Third Party TTP a third message including an authentication random number $N_{AS2\text{-}TTP}$ generated by the second Attesting System;

D) verifying, by the Trusted Third Party TTP, validity of the $Cert_{AIK\text{-}AS1}$ and the $Cert_{AIK\text{-}AS2}$, generating a verification result $Re_{AIK\text{-}AS1}$ of the $Cert_{AIK\text{-}AS1}$ and a verification result $Re_{AIK\text{-}AS2}$ of the $Cert_{AIK\text{-}AS2}$, and then verifying correctness of the $Log_{AS1}$ against the $PCRs_{AS1}$, and if it is incorrect, then discarding the message; otherwise, verifying the correctness of $Log_{AS2}$ against the $PCRs_{AS2}$, and if it is incorrect, then discarding the message; otherwise, evaluating trustworthiness of the first Attesting System against the $Log_{AS1}$ and reference integrity values of respective components in the $Log_{AS1}$ and trustworthiness of the second Attesting System against the $Log_{AS2}$ and reference integrity values of respective components in the $Log_{AS2}$, generating a platform integrity verification result $Re_{PCRs\text{-}AS1}$ and platform remediation information $Rem_{AS1}$ of the first Attesting System and a platform integrity verification result $_{RePCRs\text{-}AS2}$ and platform remediation information $Rem_{AS2}$ of the second Attesting System, calculating relevant parameters of the first Attesting System $AS_1$ and the second Attesting System $AS_2$ from the private keys and transmitting a fourth message including the relevant parameters to the AS2;

E) verifying, by the second Attesting System, the signature against the fourth message, and if the signature is invalid, then discarding the message; otherwise, generating a result of the $AS_1$ accessing the $AS_2$ and transmitting a fifth message to the first Attesting System $AS_1$; and F) verifying, by the $AS_1$, the signature against the fifth message, and if the signature is invalid, then discarding the message; otherwise, verifying the signature in the fourth message, and if the signature is invalid, then terminating the protocol process; otherwise, performing access control against the verification result $Re_{AIK\text{-}AS2}$ of the $Cert_{AIK\text{-}AS2}$, the platform integrity verification result $Re_{PCRs\text{-}As2}$ of the second Attesting System $AS_2$ and the result $Re_{access}$ of the first Attesting System $AS_1$ accessing the second Attesting System $AS_2$.

The list of Platform Configuration Registers PCR in the step A) is a list of Platform Configuration Registers PCR determined in the first Attesting System or a list of components determined in the first Attesting System.

The list of Platform Configuration Registers PCR in the step B) is a list of Platform Configuration Registers PCR determined in the second Attesting System or a list of components determined in the second Attesting System.

The messages exchanged between the first Attesting System and the second Attesting System are transported over a secure channel therebetween.

The messages exchanged between the second Attesting System and the Trusted Third Party are transported over a secure channel therebetween.

If the second Attesting System can not know platform configuration information of the first Attesting System, then the $Log_{AS1}$ and the platform remediation information $Rem_{AS1}$ of the first Attesting System are transported over a secure channel between the first Attesting System and the Trusted Third Party; and if the Attesting Identity Keys of the Attesting Systems are verified between the first Attesting System and the second Attesting System based upon Direct Anonymous Attestation DAA, then neither the fourth message nor the fifth message includes the $Cert_{AIK\text{-}AS1}$ and the verification result $Re_{AIK\text{-}AS1}$, the $Cert_{AIK\text{-}AS2}$ and the verification result $Re_{AIK\text{-}AS2}$.

The invention has the following advantages:

1) The trusted platform verification method based on Tri-element Peer Authentication according to the invention performs bidirectional trusted platform evaluation between the Attesting Systems, verifies the Attesting Identity Keys AIK and platform integrity of the Attesting Systems AS through a Trusted Third Party TTP to thereby extend the application scope.

2) The trusted platform verification method based on Tri-element Peer Authentication according to the invention adopts security architecture of Tri-element Peer Authentication and enhances security of the trusted platform evaluation protocol.

DETAILED DESCRIPTION OF THE INVENTION

Figure 1:
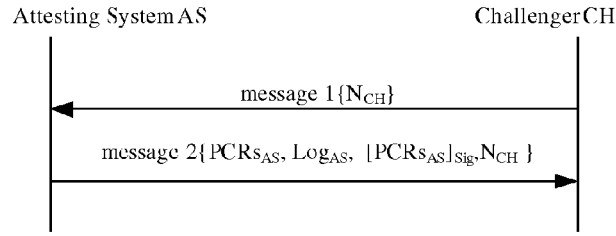
FIG. 1 illustrates a trusted platform verification method in a TCG architecture in the prior art.
Figure 2:
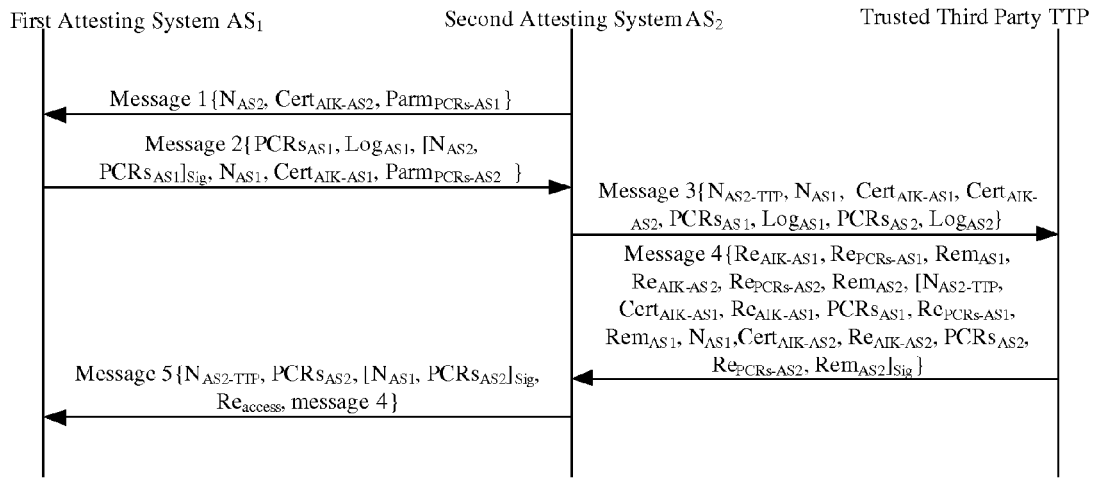
FIG. 2 illustrates a schematic diagram of the method according to the invention.

Referring to FIG. 2, the invention particularly includes the following steps:

1) A second Attesting System $AS_2$ transmits a first message to a first Attesting System $AS_1$, wherein the first message includes a random number generated by the second Attesting System, an Attesting Identity Key AIK certificate of the second Attesting System and a parameter list of Platform Configuration Register values PCRs requested by the second Attesting System from the first Attesting System.

Particularly, the first message (message 1)= $N_{AS2}\|Cert_{AIK\text{-}AS2}\|Parm_{PCRs\text{-}AS1}$, where $N_{AS2}$ is the random number generated by the second Attesting System $AS_2$, $Cert_{AIK\text{-}AS2}$ is the Attesting Identity Key AIK certificate of the second Attesting System $AS_2$, and $Parm_{PCRs\text{-}AS1}$ is the parameter list of Platform Configuration Register values PCRs requested by the second Attesting System $AS_2$ from the first Attesting System $AS_1$, which may be a list of Platform Configuration Registers PCR determined in the first Attesting System $AS_1$ or a list of components determined in the first Attesting System $AS_1$.

2) The first Attesting System $AS_1$ transports the random number to its own Trusted Platform Module TPM, extracts corresponding Platform Configuration Register values $PCRs_{AS1}$ of the first Attesting System $AS_1$ from the TPM based on the parameter list of Platform Configuration Register values PCRs, performed a signature $[N_{AS2}, PCRs_{AS1}]_{Sig}$ on the $PCRs_{AS1}$ and the $N_{AS2}$ using a private key of an Attesting Identity Key AIK of the $AS_1$, extracts the measurement logs $Log_{AS1}$ corresponding to the $PCRs_{AS1}$ from the Store Measurement Log SML of the first Attesting System $AS_1$, and transmits a second message to the second Attesting System $AS_2$, wherein the second message includes a random number generated by the $AS_1$, the Attesting Identity Key AIK certificate of the $AS_1$ and a parameter list of Platform Configuration Register values PCRs requested by the $AS_1$ from the $AS_2$.

Particularly, upon reception of the message 1, the first Attesting System $AS_1$ firstly transports the random number $N_{AS2}$ generated by the second Attesting System $AS_2$ to the Trusted Platform Module TPM of the first Attesting System $AS_1$, and then extracts from the Trusted Platform Module TPM of the first Attesting System $AS_1$ the corresponding Platform Configuration Register values $PCRs_{AS1}$ of the first Attesting System $AS_1$ based on the parameter list $Parm_{PCRs-AS1}$ of Platform Configuration Register values PCRs requested by the second Attesting System $AS_2$ from the first Attesting System $AS_1$, the signature $[N_{AS2}, PCRs_{AS1}]_{Sig}$ on the extracted Platform Configuration Register values $PCRs_{AS1}$ of the first Attesting System $AS_1$ and the random number $N_{AS2}$ generated by the second Attesting System $AS_2$ performed using the private key of the Attesting Identity Key AIK of the first Attesting System $AS_1$, extracts the measurement logs $Log_{AS1}$ corresponding to the Platform Configuration Register values $PCRs_{AS1}$ of the first Attesting System $AS_1$ from the Store Measurement Log SML of the first Attesting System $AS_1$, and finally transmits the second message (a message $2=PCRs_{AS1}\|Log_{AS1}\|[N_{AS2}, PCRs_{AS1}]_{Sig}\| N_{AS1}\| Cert_{AIK-AS1}\|Parm_{PCRs-AS2}$) to the second Attesting System $AS_2$, where $N_{AS1}$ is the random number generated by the first Attesting System $AS_1$, $Cert_{AIK-AS1}$ is an Attesting Identity Key AIK certificate of the first Attesting System $AS_1$, and $Parm_{PCRs-AS2}$ is the parameter list of Platform Configuration Register values PCRs requested by the first Attesting System $AS_1$ from the second Attesting System $AS_2$, which may be a list of Platform Configuration Registers PCR determined in the second Attesting System $AS_2$ or a list of components determined in the second Attesting System $AS_2$.

3) The second Attesting System verifies the signature against a public key of the Attesting Identity Key AIK certificate, the random number $N_{AS2}$ generated by the $AS_2$, and the $PCRs_{AS1}$, discards the second message if the signature is invalid or otherwise transmits the $N_{AS1}$ to a Trusted Platform Module TPM of the $AS_2$, extracts from the Trusted Platform Module TPM of the second Attesting System $AS_2$ corresponding Platform Configuration Register values $PCRs_{AS2}$ of the $AS_2$ based on the parameter list $Parm_{PCRs-AS2}$ of Platform Configuration Register values PCRs requested by the $AS_1$ from the $AS_2$, performs a signature $[N_{AS1}, PCRs_{AS2}]_{Sig}$ on the $PCRs_{AS2}$ and the $N_{AS1}$ using a private key of an Attesting Identity Key AIK of the $AS_2$, extracts the measurement logs $Log_{AS2}$ corresponding to the Platform Configuration Register values $PCRs_{AS2}$ of the $AS_2$ from the Store Measurement Log SML of the $AS_2$, and transmits to a Trusted Third Party TTP a third message including a authentication random number generated by the second Attesting System $AS_2$.

Particularly, upon reception of the message 2, the second Attesting System $AS_2$ firstly verifies the signature against the public key of the Attesting Identity Key AIK certificate of the first Attesting System $AS_1$, the random number $N_{AS2}$ generated by the second Attesting System $AS_2$ and the Platform Configuration Register values $PCRs_{AS1}$ of the first Attesting System $AS_1$ in the message 2, discards the message 2 if the signature is invalid or otherwise transports the random number $N_{AS1}$ generated by the first Attesting System $AS_1$ to the Trusted Platform Module TPM of the second Attesting System $AS_2$, and then extracts from the Trusted Platform Module TPM of the second Attesting System $AS_2$ the corresponding Platform Configuration Register values $PCRs_{AS2}$ of the second Attesting System $AS_2$ based on the parameter list $Parm_{PCRs-AS2}$ of Platform Configuration Register values PCRs requested by the first Attesting System $AS_1$ from the second Attesting System $AS_2$, performs the signature $[N_{AS1}, PCRs_{AS2}]_{Sig}$ on the extracted Platform Configuration Register values $PCRs_{AS2}$ of the second Attesting System $AS_2$ and the random number $N_{AS1}$ generated by the first Attesting System $AS_1$ using the private key of the Attesting Identity Key AIK of the second Attesting System $AS_2$, extracts the measurement logs $Log_{AS2}$ corresponding to the Platform Configuration Register values $PCRs_{AS2}$ of the second Attesting System $AS_2$ from the Store Measurement Log SML of the second Attesting System $AS_2$, and finally transmits the third message (a message 3) to the Trusted Platform Party TTP, where the message $3=N_{AS2-TTP}\|N_{AS1}\|Cert_{AIK-AS1}\|Cert_{AIK-AS2}\| PCRs_{AS1}\| Log_{AS1}\|PCRs_{AS2}\|Log_{AS2}$ and wherein $N_{AS2-TTP}$ is the authentication random number generated by the second Attesting System $AS_2$.

4) The Trusted Platform Party TTP verifies validity of the $Cert_{AIK-AS1}$ and the $Cert_{AIK-AS2}$, generates a verification result $Re_{AIK-AS1}$ of the $Cert_{AIK-AS1}$ and a verification result $Re_{AIK-AS2}$ of the $Cert_{AIK-AS2}$, verifies correctness of the corresponding measurement logs $Log_{AS1}$ against the $PCRs_{AS1}$ and discards the message if it is incorrect or otherwise verifies the correctness of the measurement logs $Log_{AS2}$ corresponding to the $PCRs_{AS2}$ against the $PCRs_{AS2}$ and discards the message if it is incorrect or otherwise evaluates trustworthiness of the first Attesting System $AS_1$ against the measurement logs $Log_{AS1}$ and reference integrity values of respective components in the $Log_{AS1}$ and trustworthiness of the first Attesting System $AS_2$ against the measurement logs $Log_{AS2}$ and reference integrity values of respective components in the $Log_{AS2}$, generates a platform integrity verification result $Re_{PCRs-AS1}$ and platform remediation information $Rem_{AS1}$ of the first Attesting System $AS_1$ and a platform integrity verification result $Re_{PCRs-AS2}$ and platform remediation information $Rem_{AS2}$ of the second Attesting System $AS_2$, calculates relevant parameters of the first Attesting System $AS_1$ and the second Attesting System $AS_2$ from the private keys and transmits a fourth message including the relevant parameters to the AS2.

Particularly, upon reception of the message 3, the Trusted Platform Party TTP firstly verifies validity of the Attesting Identity Key AIK certificate $Cert_{AIK-AS1}$ of the first Attesting System $AS_1$ and the Attesting Identity Key AIK certificate $Cert_{AIK-AS2}$ of the second Attesting System $AS_2$, generates the verification result $Re_{AIK-AS1}$ of the Attesting Identity Key AIK certificate $Cert_{AIK-AS1}$ of the first Attesting System $AS_1$ and the verification result $Re_{AIK-AS2}$ of the Attesting Identity Key AIK certificate $Cert_{AIK-AS2}$ of the second Attesting System $AS_2$, verifies correctness of the measurement logs $Log_{AS1}$ corresponding to the Platform Configuration Register values $PCRs_{AS1}$ of the first Attesting System $AS_1$ in the message 3 against the Platform Configuration Register values $PCRs_{AS1}$ of the first Attesting System $AS_1$ in the message 3 and discards the message if it is incorrect or otherwise verifies correctness of the measurement logs $Log_{AS2}$ corresponding to the Platform Configuration Register values $PCRs_{AS2}$ of the second Attesting System $AS_2$ in the message 3 against the Platform Configuration Register values $PCRs_{AS2}$ of the second Attesting System $AS_2$ in the message 3 and discards the message if it is incorrect or otherwise evaluates trustworthiness of the first Attesting System $AS_1$ against the measurement logs $Log_{AS1}$ corresponding to the Platform Configuration Register values $PCRs_{AS1}$ of the first Attesting System $AS_1$ in the message 3 and the reference integrity values of the respective components in the measurement logs $Log_{AS1}$ and the reference integrity values of the respective components in the measurement logs $Log_{AS1}$ and evaluates trustworthiness of the second Attesting System $AS_2$ against the measurement logs $Log_{AS2}$ corresponding to the Platform Configuration Register values $PCRs_{AS2}$ of the second Attesting System $AS_2$ in the message 3 and the reference integrity values of the respective components in the measurement logs $Log_{AS2}$, and generates the platform integrity verification result $Re_{PCRs-AS1}$ and the platform remediation information $Rem_{AS1}$ of the first Attesting System $AS_1$ and the platform integrity verification result $Re_{PCRs-AS2}$ and the platform remediation information $Rem_{AS2}$ of the second Attesting System $AS_2$, and next the Trusted Platform Party TTP calculates against the private keys a signature $[N_{AS2-TTP}||Cert_{AIK-AS1}|| Re_{AIK-AS1}||PCRs_{AS1}||Re_{PCRs-AS1}||Rem_{AS1}||N_{AS1}||Cert_{AIK-AS2}|| Re_{AIK-AS2}||PCRs_{AS2}||Re_{PCRs-AS2}||Rem_{AS2}]_{Sig}$ on the authentication random number $N_{AS2-TTP}$ generated by the second Attesting System $AS_2$, the Attesting Identity Key AIK certificate $Cert_{AIK-AS1}$ of the first Attesting System $AS_1$, the verification result $Re_{AIK-AS1}$ of the Attesting Identity Key AIK certificate $Cert_{AIK-AS1}$ of the first Attesting System $AS_1$, the Platform Configuration Register values $PCRs_{AS1}$ of the first Attesting System $AS_1$, the platform integrity verification result $Re_{PCRs-AS1}$ of the first Attesting System $AS_1$, the platform remediation information $Rem_{AS1}$ of the first Attesting System $AS_1$, the random number $N_{AS1}$ generated by the first Attesting System $AS_1$, the Attesting Identity Key AIK certificate $Cert_{AIK-AS2}$ of the second Attesting System $AS_2$, the verification result $Re_{AIK-AS2}$ of the Attesting Identity Key AIK certificate $Cert_{AIK-AS2}$ of the second Attesting System $AS_2$, the Platform Configuration Register values $PCRs_{AS2}$ of the second Attesting System $AS_2$, the platform integrity verification result $Re_{PCRs-AS2}$ of the second Attesting System $AS_2$, and the platform remediation information $Rem_{AS2}$ of the second Attesting System $AS_2$, and finally transmits to the second Attesting System $AS_2$ the message $4=Re_{AIK-AS1}||Re_{PCRs-AS1}||Rem_{AS1}||Re_{AIK-AS2}||Re_{PCRs-AS2}||Rem_{AS2}||[N_{AS2-TTP}||Cert_{AIK-AS1}||Re_{AIK-AS1}||PCRs_{AS1}||Re_{PCRs-AS1}||Rem_{AS1}||N_{AS1}||Cert_{AIK-AS2}||Re_{AIK-AS2}||PCRs_{AS2}||Re_{PCRs-AS2}||Rem_{AS2}]_{Sig}$.

5) The $AS_2$ verifies the signature against the fourth message and discards the message if the signature is invalid or otherwise generates a result of the $AS_1$ accessing the $AS_2$ and transmits a fifth message to the first Attesting System $AS_1$.

Particularly, upon reception of the message 4, the second Attesting System $AS_2$ firstly verifies the signature $[N_{AS2-TTP}||Cert_{AIK-AS1}||Re_{AIK-AS1}||PCRs_{AS1}||Re_{PCRs-AS1}||Rem_{AS1}||N_{AS1}||Cert_{AIK-AS2}||Re_{AIK-AS2}||PCRs_{AS2}||Re_{PCRs-AS2}||Rem_{AS2}]_{Sig}$ against a public key of the Trustworthy Platform Party TTP and discards the message if the signature is invalid or otherwise generates the result $Re_{access}$ of the first Attesting System $AS_1$ accessing the second Attesting System $AS_2$, based on the verification result $Re_{AIK-AS1}$ of the Attesting Identity Key AIK certificate $Cert_{AIK-AS1}$ of the first Attesting System $AS_1$ and the platform integrity verification result $Re_{PCRs-AS1}$ of the first Attesting System $AS_1$ in the message 4, wherein a value of the result $Re_{access}$ is Allowed/Disallowed/Isolated, and then transmits a message $5=N_{AS2-TTP}||PCRs_{AS2}||[N_{AS1}||PCRsAS2]_{Sig}||Re_{access}||$ to the first Attesting System $AS_1$.

6) The $AS_1$ verifies the signature against the fifth message and discards the message if the signature is invalid or otherwise verifies the signature in the fourth message and terminates the protocol process if the signature is invalid or otherwise performs access control against the verification result $Re_{AIK-AS2}$ of the $Cert_{AIK-AS2}$, the platform integrity verification result $Re_{PCRs-AS2}$ of the second Attesting System $AS_2$ and the result $Re_{access}$ of the first Attesting System $AS_1$ accessing the second Attesting System $AS_2$.

Particularly, upon reception of the fifth message (the message 5), the first Attesting System $AS_1$ firstly verifies the signature $[N_{AS1}||PCRs_{AS2}]_{Sig}$ against the public key of the Attesting Identity Key AIK certificate $Cert_{AIK-AS2}$ of the second Attesting System $AS_2$ and discards the message if the signature is invalid or otherwise verifies the signature $[N_{AS2-TTP}||Cert_{AIK-AS1}||Re_{AIK-AS1}||PCRs_{AS1}||Re_{PCRs-AS1}||Rem_{AS1}||N_{AS1}||Cert_{AIK-AS2}||Re_{AIK-AS2}||PCRs_{AS2}||Re_{PCRs-AS2}||Rem_{AS2}]_{Sig}$ in the message 4 and terminates the protocol process if the signature is invalid or otherwise performs access control against the verification result $Re_{AIK-AS2}$ of the Attesting Identity Key AIK certificate $Cert_{AIK-AS2}$ of the second Attesting System $AS_2$ and the platform integrity verification result $Re_{PCRs-AS2}$ of the second Attesting System $AS_2$ in the message 4 and the result $Re_{access}$ of the first Attesting System $AS_1$ accessing the second Attesting System $AS_2$.

In the foregoing trusted platform evaluation protocol based on Tri-element Peer Authentication, the messages exchanged between the first Attesting System $AS_1$ and the second Attesting System $AS_2$ are transported over a secure channel therebetween; the messages exchanged between the second Attesting System $AS_2$ and the Trusted Third Party TTP are transported over a secure channel therebetween; if the first Attesting System $AS_1$ does not wish any knowledge of the second Attesting System $AS_2$ about platform configuration information of the first Attesting System $AS_1$, then the measurement logs $Log_{AS1}$ corresponding to the Platform Configuration Register values $PCRs_{AS1}$ of the first Attesting System $AS_1$ and the platform remediation information $Rem_{AS1}$ of the first Attesting System $AS_1$ are transported over a secure channel between the first Attesting System $AS_1$ and the Trusted Third Party TTP; and if the Attesting Identity Keys AIK of the Attesting Systems AS are verified between the first Attesting System $AS_1$ and the second Attesting System $AS_2$ based upon Direct Anonymous Attestation DAA, then neither the message 4 nor the message 5 includes the Attesting Identity Key AIK certificate $Cert_{AIK-AS1}$ and the verification result $Re_{AIK-AS1}$ of the first Attesting System $AS_1$ and the Attesting Identity Key AIK certificate $Cert_{AIK-AS2}$ and the verification result $Re_{AIK-AS2}$ of the second Attesting System $AS_2$.

The invention claimed is:

1. A trusted platform verification method based on Tri-element Peer Authentication, comprising the steps of:

A) transmitting, by a second Attesting System, a first message to a first Attesting System, wherein the first message comprises a random number $N_{AS2}$ generated by the second Attesting System, an Attesting Identity Key AIK certificate $Cert_{AIK-AS2}$ of the second Attesting System and a parameter list $Parm_{PCRs-AS1}$ of Platform Configuration Register values PCRs requested by the second Attesting System from the first Attesting System;

B) transporting, by the first Attesting System, the $N_{AS2}$ to a Trusted Platform Module TPM of the first Attesting System, and then extracting a corresponding Platform Configuration Register values $PCRS_{AS1}$ from the Trusted Platform Module TPM based on the parameters list $Parm_{PCRs-AS1}$ of PCRs performing a signature $[N_{AS2}, PCRS_{AS1}]$sig on the $PCRS_{AS1}$ and the $N_{AS2}$ using a private key of an Attesting Identity Key AIK of the first Attesting System, extracting a measurement logs $Log_{AS1}$ corresponding to the $PCRS_{AS1}$ from the a Store Measurement Log SML of the first Attesting System; and transmitting a second message to the second Attesting System $AS_2$, wherein the second message comprises a random number $N_{AS1}$, generated by the first Attesting System, an Attesting Identity Key AIK certificate $Cert_{AIK-AS1}$ of the first Attesting System and a parameter list $Parm_{PCRs-AS2}$ of Platform Configuration Register values PCRs requested by the first Attesting System from the second Attesting System;

C) verifying, by the second Attesting System, the signature against a public key of the Attesting Identity Key AIK certificate of the first Attesting System, the $NAS_2$ and the $PCRS_{AS1}$, and if the signature is invalid, then discarding the second message; otherwise, transmitting the $N_{AS1}$ to a Trusted Platform Module TPM of the second Attesting System, extracting from the Trusted Platform Module TPM of the second Attesting System corresponding Platform Configuration Register values $PCRS_{AS2}$ against the $Parm_{PCRs-AS2}$, performing a signature $[N_{AS1}, PCRS_{AS2}]$sig on the $PCRS_{AS2}$ and the $N_{AS1}$ using a private key of an Attesting Identity Key AIK of the second Attesting System, extracting the a measurement logs $Log_{AS2}$ corresponding to the Platform Configuration Register values $PCRS_{AS2}$ from the Store Measurement Log SML of the second Attesting System; and transmitting to a Trusted Third Party TTP a third message comprising an authentication random number $N_{AS2-TTP}$ generated by the second Attesting System;

D) verifying, by the Trusted Third Party TTP, validity of the $Cert_{AIK-AS1}$ and the $Cert_{AIK-AS2}$, generating a verification result $Re_{AIK-AS1}$ of the $Cert_{AIK-AS1}$ and a verification result $Re_{AIK-AS2}$ of the $Cert_{AIK-AS2}$, and then verifying correctness of the $Log_{AS1}$ against the $PCRS_{AS1}$, and if it is incorrect, then discarding the message; otherwise, verifying correctness of the $Log_{AS2}$ against the $PCRS_{AS2}$, and if it is incorrect, then discarding the message; otherwise, evaluating trustworthiness of the first Attesting System against the $Log_{AS2}$ and reference integrity values of respective components in the $Log_{AS1}$ and trustworthiness of the second Attesting System against the $Log_{As2}$ and reference integrity values of respective components in the $Log_{As2}$, generating a platform integrity verification result $Re_{PCRs-As1}$ and platform remediation information $Rem_{AS1}$ of the first Attesting System and a platform integrity verification result $Re_{PCRs-AS2}$ and platform remediation information $Rem_{AS2}$ of the second Attesting System, calculating relevant parameters of the first Attesting System $AS_1$ and the second Attesting System $AS_2$ from the private keys and transmitting a fourth message comprising the relevant parameters to the $AS_2$;

E) verifying, by the second Attesting System, the signature against the fourth message, and if the signature is invalid, then discarding the message; otherwise, generating a result of the $AS_1$ accessing the $AS_2$ and transmitting a fifth message to the first Attesting System $AS_1$; and F) verifying, by the $AS_1$, the signature against the fifth message, and if the signature is invalid, then discarding the message; otherwise, verifying the signature in the fourth message, and if the signature is invalid, then terminating protocol process; otherwise, performing access control against the verification result $Re_{AIK-As2}$ of the $Cert_{AIK-As2}$, the platform integrity verification result $Re_{PCRs-As2}$ of the second Attesting System $AS2$ and a result $Re_{access}$ of the first Attesting System $AS_1$, accessing the second Attesting System $AS_2$.

2. The trusted platform verification method based on Tri-element Peer Authentication according to claim 1, wherein the list of Platform Configuration Registers PCR in the step A) is a list of Platform Configuration Registers PCR determined in the first Attesting System or a list of components determined in the first Attesting System.

3. The trusted platform verification method based upon Tri-element Peer Authentication according to claim 1, wherein the list of Platform Configuration Registers PCR in the step B) is a list of Platform Configuration Registers PCR determined in the second Attesting System or a list of components determined in the second Attesting System.

4. The trusted platform verification method based upon Tri-element Peer Authentication according to claim 1, wherein the messages exchanged between the first Attesting System and the second Attesting System are transported over a secure channel therebetween.

5. The trusted platform verification method based upon Tri-element Peer Authentication according to claim 1, wherein the messages exchanged between the second Attesting System and the Trusted Third Party are transported over a secure channel there between.

6. The trusted platform verification method based upon Tri-element Peer Authentication according to claim 1, wherein if the second Attesting System cannot know platform configuration information of the first Attesting System, then the $Log_{AS1}$ and the platform remediation information $Rem_{AS1}$ of the first Attesting System are transported over a secure channel between the first Attesting System and the Trusted Third Party; and if the Attesting Identity Keys of the Attesting Systems are verified between the first Attesting System and the second Attesting System based on Direct Anonymous Attestation DAA, then neither the fourth message nor the fifth message comprises the $Cert_{AIK-AS2}$ and the verification result $Re_{AIK-AS2}$ of the $Cert_{AIK-AS2}$ and the $Cert_{AIK-As2}$ and the verification result $Re_{AIK-AS2}$ of the $Cert_{AIK-AS2}$.

7. The trusted platform verification method based on Tri-element Peer Authentication according to claim 1, wherein relevant parameters of the first Attesting System $AS_1$ and the second Attesting System $AS_2$ comprise a signature on the authentication random number $N_{AS2-TTP}$ generated by the second Attesting System, the Attesting Identity Key AIK certificate $Cert_{AIK-AS1}$ of the first Attesting System, the verification result $Re_{AIK-AS1}$ of the Attesting Identity Key AIK certificate $Cert_{AIK-AS1}$ of the first Attesting System, the Platform Configuration Register values $PCRs_{AS1}$ of the first Attesting System, the platform integrity verification result $Re_{PCRs-AS1}$ of the first Attesting System, the platform remediation information $Rem_{AS1}$ of the first Attesting System, the random number $N_{AS1}$ generated by the first Attesting System, the Attesting Identity Key AIK certificate $Cert_{AIK-AS2}$ of the second Attesting System, the verification result $Re_{AIK-AS2}$ of the Attesting Identity Key AIK certificate $Cert_{AIK-AS2}$ of the second Attesting System, the Platform Configuration Register values $PCRs_{AS2}$ of the second Attesting System, the platform integrity verification result $Re_{PCRs\text{-}Ast2}$ of the second Attesting System and the platform remediation information $Rem_{AS2}$ of the second Attesting System.

8. The trusted platform verification method based upon Tri-element Peer Authentication according to claim 2, wherein if the second Attesting System cannot know platform configuration information of the first Attesting System, then the $Log_{AS1}$ and the platform remediation information $Rem_{AS1}$ of the first Attesting System are transported over a secure channel between the first Attesting System and the Trusted Third Party; and if the Attesting Identity Keys of the Attesting Systems are verified between the first Attesting System and the second Attesting System based on Direct Anonymous Attestation DAA, then neither the fourth message nor the fifth message comprises the $Cert_{AIK\text{-}AS1}$ and the verification result $Re_{AIK\text{-}AS2}$ of the $Cert_{AIK\text{-}AS1}$ and the $Cert_{AIK\text{-}AS2}$ and the verification result $Re_{AIK\text{-}AS2}$ of the $Cert_{AIK\text{-}AS2}$.

9. The trusted platform verification method based upon Tri-element Peer Authentication according to claim 3, wherein if the second Attesting System cannot know platform configuration information of the first Attesting System, then the $Log_{AS1}$ and the platform remediation information $Rem_{AS1}$ of the first Attesting System are transported over a secure channel between the first Attesting System and the Trusted Third Party; and if the Attesting Identity Keys of the Attesting Systems are verified between the first Attesting System and the second Attesting System based on Direct Anonymous Attestation DAA, then neither the fourth message nor the fifth message comprises the $Cert_{AIK\text{-}AS1}$ and the verification result $Re_{AIK\text{-}AS1}$ of the $Cert_{AIK\text{-}AS2}$ and the $Cert_{AIK\text{-}AS2}$ and the verification result $Re_{AIK\text{-}AS2}$ of the $Cert_{AIK\text{-}AS2}$.

10. The trusted platform verification method based upon Tri-element Peer Authentication according to claim 4, wherein if the second Attesting System cannot know platform configuration information of the first Attesting System, then the $Log_{AS1}$ and the platform remediation information $Rem_{AS1}$ of the first Attesting System are transported over a secure channel between the first Attesting System and the Trusted Third Party; and if the Attesting Identity Keys of the Attesting Systems are verified between the first Attesting System and the second Attesting System based on Direct Anonymous Attestation DAA, then neither the fourth message nor the fifth message comprises the $Cert_{AIK\text{-}AS1}$ and the verification result $Re_{AIK\text{-}AS1}$ of the $Cert_{AIK\text{-}AS1}$ and the $Cert_{AIK\text{-}AS2}$ and the verification result $Re_{AIK\text{-}AS2}$ of the $Cert_{AIK\text{-}AS2}$.

11. The trusted platform verification method based upon Tri-element Peer Authentication according to claim 5, wherein if the second Attesting System cannot know platform configuration information of the first Attesting System, then the $Log_{AS1}$ and the platform remediation information $Rem_{AS1}$ of the first Attesting System are transported over a secure channel between the first Attesting System and the Trusted Third Party; and if the Attesting Identity Keys of the Attesting Systems are verified between the first Attesting System and the second Attesting System based on Direct Anonymous Attestation DAA, then neither the fourth message nor the fifth message comprises the $Cert_{AIK\text{-}AS1}$ and the verification result $Re_{AIK\text{-}AS1}$ of the $Cert_{AIK\text{-}AS1}$ and the $Cert_{AIK\text{-}AS2}$ and the verification result $Re_{AIK\text{-}AS2}$ of the $Cert_{AIK\text{-}AS2}$.

* * * * *